US011409715B2

(12) United States Patent
Thirumalai et al.

(10) Patent No.: US 11,409,715 B2
(45) Date of Patent: Aug. 9, 2022

(54) MAINTAINING HIGH-AVAILABILITY OF A FILE SYSTEM INSTANCE IN A CLUSTER OF COMPUTING NODES

(71) Applicant: HEWLETT PACKARD ENTERPRISE DEVELOPMENT LP, Houston, TX (US)

(72) Inventors: Dhanwa Thirumalai, Bangalore (IN); Peter William Madany, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 363 days.

(21) Appl. No.: 16/593,568

(22) Filed: Oct. 4, 2019

(65) Prior Publication Data

US 2021/0103563 A1  Apr. 8, 2021

(51) Int. Cl.
| | | |
|---|---|---|
| *G06F 16/182* | (2019.01) | |
| *G06F 16/174* | (2019.01) | |
| *G06F 11/10* | (2006.01) | |
| *G06F 11/30* | (2006.01) | |
| *H04L 67/1034* | (2022.01) | |
| *G06F 16/11* | (2019.01) | |

(52) U.S. Cl.
CPC ...... *G06F 16/1844* (2019.01); *G06F 11/1092* (2013.01); *G06F 11/3055* (2013.01); *G06F 16/128* (2019.01); *G06F 16/1756* (2019.01); *H04L 67/1034* (2013.01)

(58) Field of Classification Search
CPC ............... G06F 16/1844; G06F 16/128; G06F 16/1756; G06F 11/2023; G06F 11/2035; G06F 11/2048; G06F 11/1658; G06F 11/3055; G06F 11/1092; G06F 11/2041; G06F 11/2097; G06F 2201/84; G06F 2201/815; H04L 67/1095; H04L 67/10; H04L 69/40; H04L 67/1097; H04L 67/1034
USPC ........................................................ 707/610
See application file for complete search history.

(56) References Cited

U.S. PATENT DOCUMENTS

| | | | | |
|---|---|---|---|---|
| 6,732,289 | B1 * | 5/2004 | Talagala | G06F 11/2092 714/6.3 |
| 6,978,398 | B2 * | 12/2005 | Harper | G06F 11/2028 714/13 |
| 6,986,076 | B1 * | 1/2006 | Smith | G06F 11/004 714/4.11 |
| 7,043,663 | B1 * | 5/2006 | Pittelkow | G06F 11/2092 714/4.4 |
| 7,069,308 | B2 * | 6/2006 | Abrams | G06Q 10/10 705/319 |

(Continued)

*Primary Examiner* — Shahid A Alam
(74) *Attorney, Agent, or Firm* — Hewlett Packard Enterprise Patent Department

(57) ABSTRACT

A method for maintaining high-availability of file system instances is described. The method includes maintaining replica file system instances such as a first replica file system instance on a first computing node and a second replica file system instance on a second computing node. Further, a third computing node is instructed to create a sparse replica file system instance on the third computing node in response to detection of a failure condition associated with the second computing node. Moreover, a data update request is directed to the first replica file system instance and the sparse replica file system.

18 Claims, 9 Drawing Sheets

(56) References Cited

U.S. PATENT DOCUMENTS

| | | | |
|---|---|---|---|
| 7,831,639 B1* | 11/2010 | Panchbudhe | G06F 16/10 |
| | | | 707/816 |
| 9,342,417 B2* | 5/2016 | Usgaonkar | H04L 67/1097 |
| 9,424,301 B2* | 8/2016 | Dhavale | G06F 16/2308 |
| 2004/0111441 A1* | 6/2004 | Saito | G06F 16/1834 |
| | | | 707/999.2 |
| 2004/0117345 A1* | 6/2004 | Bamford | G06F 16/2386 |
| 2007/0050423 A1* | 3/2007 | Whalen | G06F 16/1752 |
| | | | 707/999.2 |
| 2010/0306192 A1* | 12/2010 | Kapur | G06F 16/9535 |
| | | | 707/723 |
| 2011/0099420 A1* | 4/2011 | MacDonald McAlister | |
| | | | G06F 16/178 |
| | | | 714/6.32 |
| 2012/0254110 A1* | 10/2012 | Takemoto | G06F 16/184 |
| | | | 707/624 |
| 2017/0249335 A1* | 8/2017 | Sengupta | G06F 16/128 |
| 2020/0250149 A1* | 8/2020 | Bono | G06F 16/1844 |

\* cited by examiner

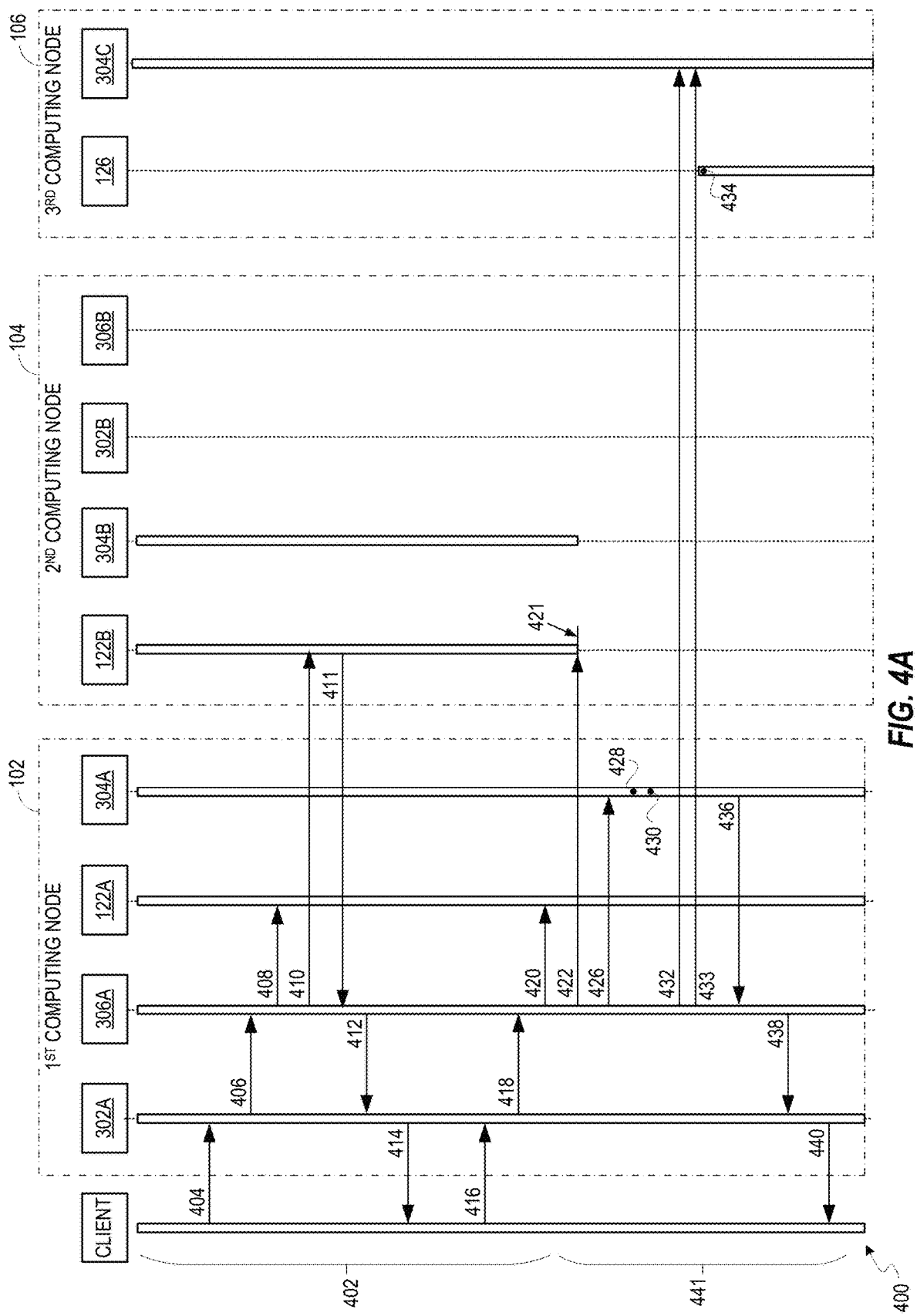

MAINTAINING HIGH-AVAILABILITY OF A FILE SYSTEM INSTANCE IN A CLUSTER OF COMPUTING NODES

BACKGROUND

Computing systems may store data. Data may be served via storage protocols. Computing systems may operate to store data with high or continuous availability. For example, data may be replicated between computing systems in a failure domain, and a computing system may take over storage access responsibilities for a failed computing system.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIGS. 4A and 4B collectively depict a sequence diagram showing example interactions among the computing nodes in the cluster of FIG. 3 to maintain high-availability of a file system instance, in accordance with another example;

Figure 1:
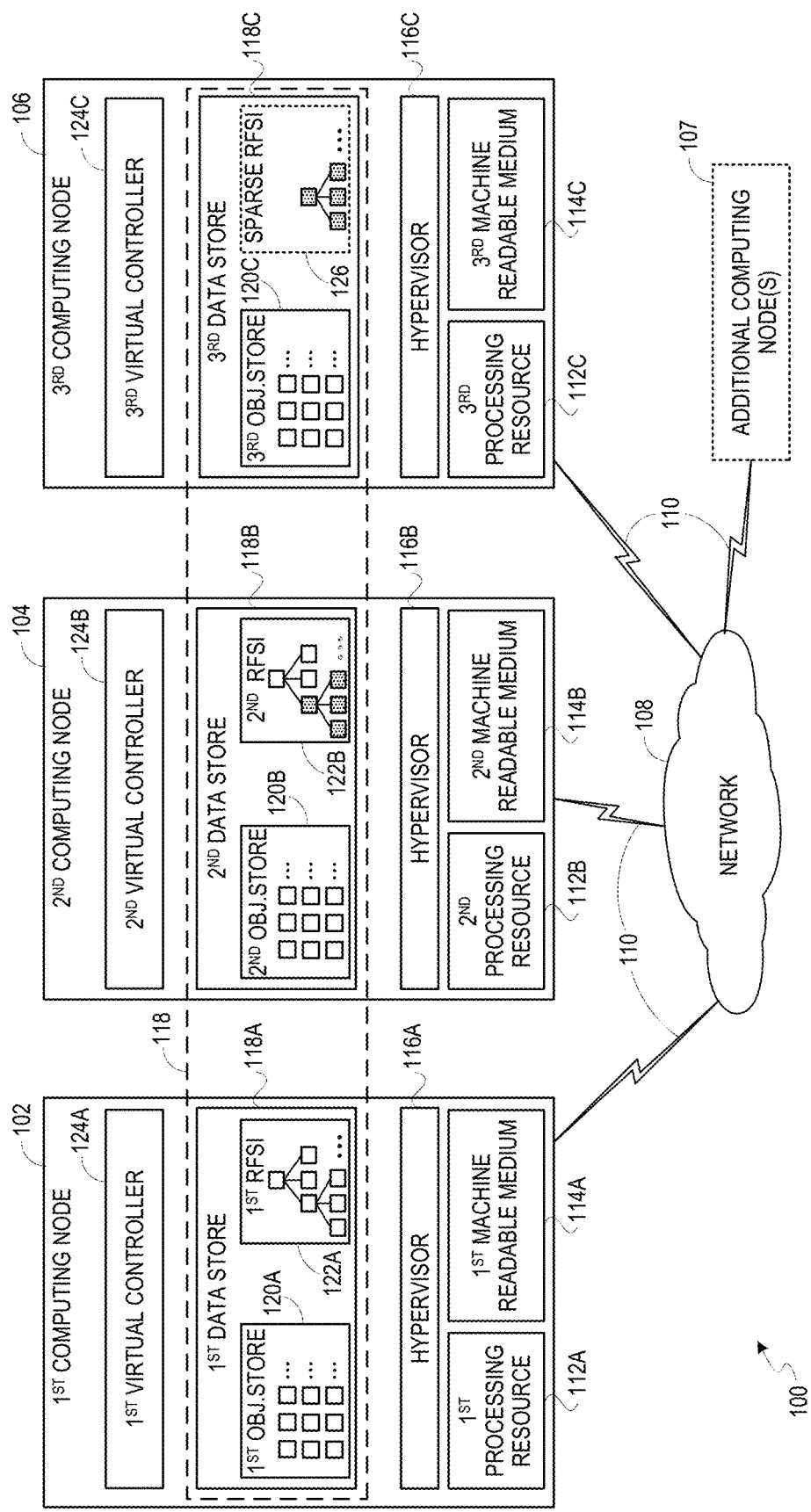
FIG. 1 illustrates a cluster of computing nodes, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on computing systems (hereinafter referred to as computing nodes), such as, but not limited to, servers, computer appliances, workstations, storage systems, or converged or hyperconverged systems. To store data, some computing nodes may utilize a data virtualization platform that abstracts, into data stores (e.g., a virtual or logical storage), aspects of a physical storage on which the data is physically stored (e.g., aspects such as addressing, configurations, etc.). The physical storage may be implemented using hardware, such as, hard disk drives, solid state drives, and the like. The data stores may be referenced by a user environment (e.g., to an operating system, applications, processes, etc.). The data virtualization platform may also provide data services such as deduplication, compression, replication, and the like.

In some implementations, a data store may be implemented, maintained, and managed, at least in part, by one or more virtual controllers. A virtual controller may be a virtual machine executing on hardware resources, such as a processor and memory, with specialized processor-executable instructions to establish and maintain the data store. In other implementations, the virtual controller may be implemented by other forms of virtualization, such as containers. In some instances, the data store may be an object-based data store. In an object-based data store, data may be stored as objects in an object store. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index. Objects in the object-based data store may be hierarchically related to a root object in an object tree (e.g., a Merkle tree) or any other hierarchical arrangement (e.g., directed acyclic graphs, etc.). The hierarchical arrangement of objects may be referred to as a file system instance or a hive. In some instances, one or more file system instances may be dedicated to an entity, such as a particular virtual machine or virtual controller, a database, a user, or a client. Objects in the object store may be referenced in the one or more file system instances.

In order to provide high or continuous availability of data, computing nodes participating a virtualized distributed network may be arranged into failure domains. For example, a failure domain may be a cluster of computing nodes connected over a network. In some cases, a file system instance may be replicated between two or more computing nodes in the cluster. Occasionally, a computing node in the cluster may become unavailable to service client requests to access or update data. Unavailability of the computing node may arise, for example, due to a network partition, a partial or complete failure of that computing node, a disconnection of that computing node from the network, or other situations. Therefore, it is desirable to maintain high-availability (HA) of the file system instance across at least two computing nodes in the cluster. In some examples, the file system instance corresponding to a virtual machine (VM), for example, may be stored in at least two computing nodes as replicas, for example, one replica of the file system instance may be stored locally on a computing node hosting the VM while another replica may be stored on a different computing node in the cluster.

Some example systems may support only two-way replication across computing nodes in the cluster to reduce the total system cost while providing HA for the data. In such two-way replication, a file system instance is replicated only in two computing nodes in the cluster. A drawback of this implementation is that if one of the computing nodes hosting a replica file system instance fails in the cluster, virtual machines (VMs) hosted on the failed computing node will enter an 'HA non-compliant' state when servicing data update requests (e.g., data write requests). Moreover, information regarding such "HA non-compliant" state may be displayed to a user or administrator. Also, as one computing node has failed, data updates corresponding to the data update requests are stored only on a surviving computing node. Therefore, in a situation when the computing node that has survived also fails, the system may encounter data unavailability (DU) condition. Now, if the node that first failed recovers, it will have stale data and to avoid data loss (DL), no write requests can be served for the VM until the node that served the last data update request comes back up again and data on current computing node (e.g., the recovered node) is synchronized with last data update. This problem may be exacerbated if a typical installation at a customer site scales to 4 or more nodes (leading to increased likelihood of a computing node failing) and if the storage devices' input-output operations per second increases (which means more of the data per unit time remains unprotected).

Further, certain other systems may implement n-way replication, for example, 3-way replication, which may include replicating full data for the VM on three (or even more if n>3) computing nodes. While this may be good for some VMs, in general, it increases the cost of the system, especially if costly physical storage devices are used. Moreover, in some instances, it may incur extra networking operations for each data update to complete the n-way replication.

In order to obviate above mentioned challenges, a method is proposed in the present disclosure to maintain high-availability of file system instances in a cluster of computing nodes. In the cluster of computing nodes, during a normal operation, replicas of a file system instance pertaining to a VM or other entity, for example, may be maintained in a first computing node and a second computing node coupled to each other via a network. The replicas of the file system instance includes a first replica file system instance stored on a first computing node and a second replica file system instance stored on a second computing node.

In accordance with some aspects of the present disclosure, when a failure of the second computing node is detected, a third computing node coupled to the network is instructed to create a sparse replica file system instance in the third computing node. Once the sparse replica file system instance is created, incoming data update requests may be directed to the first replica file system instance on the first computing node and the sparse replica file system instance on the third computing node. Accordingly, the DU and/or DL conditions may be prevented. Moreover, a method for rebuilding the second replica file system instance using the sparse replica file system instance is also described. Further, once the second replica file system instance is rebuilt upon recovery of the second computing system, the sparse replica file system instance may be updated, and in particular, truncated or pruned to save storage space on the third computing node. Advantageously, use of the sparse replica file system instance may obviate extra storage space, extra CPU time, and networking overhead involved with full 3-way replication. Also, the DU and/or DL conditions may be prevented, as noted hereinabove. Moreover, use of such sparse replica file system instance may also prevent a VM from entering an "HA non-compliant" state, thereby preventing unnecessary notifications to the users.

Figure 2:
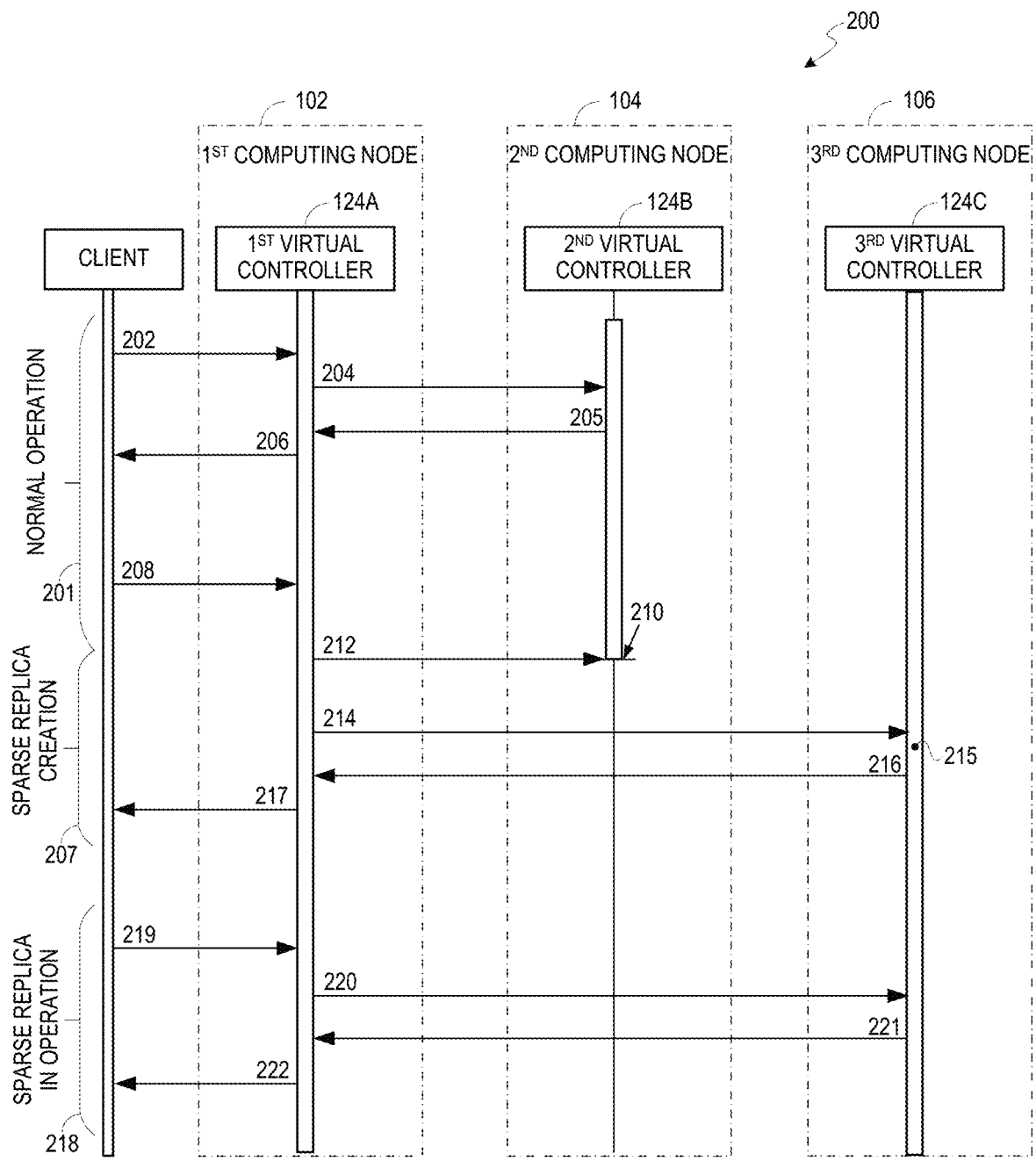
FIG. 2 is a sequence diagram depicting example interactions among the computing nodes in the cluster of FIG. 1 to maintain high-availability of a file system instance, in accordance with an example.

Referring now to drawings, a cluster 100 of computing nodes is presented in FIG. 1, in accordance with an example. The cluster 100 of FIG. 1 may include a first computing node 102, a second computing node 104, and a third computing node 106 (hereinafter collectively referred to as computing nodes 102-106) coupled to each other via a network 108. For ease of explanation, FIG. 1 is described along with FIG. 2 which depicts a sequence diagram 200 showing example interactions among the computing nodes 102-106 in the cluster 100 of FIG. 1 to maintain high-availability of the file system instance, in accordance with another example.

The notations "$1^{ST}$," "$2^{ND}$," and "$3^{RD}$," as used in the accompanying drawings respectively represent the terms "first," "second," and "third" used in the description. Although the present example of the cluster 100 of FIG. 1 refers to three computing nodes for convenience, the various aspects described herein are also applicable to network systems that include one or more additional nodes 107. Each of the computing nodes 102-106 as well as any additional computing nodes such as the computing node 107, may be a computer, a device including a processor or microcontroller and/or any other electronic component, or a device or system that performs one or more operations according to one or more programming instructions. Examples of the computing nodes 102-106, 107 may include, but are not limited to, a desktop computer, a laptop, a smartphone, a server, a computer appliance, a workstation, a storage system, or a converged or hyperconverged system, and the like.

The computing nodes 102-106, 107 may be coupled to the network 108 via communication links 110, as depicted in FIG. 1. The network 108 may refer to a medium that interconnects plurality of computing nodes. Examples of the network 108 may include, but are not limited to, local area network (LAN), wireless LAN (WLAN), metropolitan area network (MAN), wide area network (WAN), and the Internet. Communication over the network 108 may be performed in accordance with various communication protocols such as, but not limited to, Transmission Control Protocol and Internet Protocol (TCP/IP), User Datagram Protocol (UDP), IEEE 802.11n, and cellular communication protocols over the communication links 110. The communication links 110 may be enabled via a wired (e.g., Ethernet, optical communication, etc.) or wireless (e.g., Wi-Fi®, cellular communication, satellite communication, etc.) communication technologies.

Further, in some implementations, each of the computing nodes 102-106, 107 may include a processing resource and a machine readable medium. For example, the first computing node 102 may include a first processing resource 112A, and a first machine readable medium 114A as shown in FIG. 1. Similarly, the second computing node 104 may include a second processing resource 112B and a second machine readable medium 114B. Also, the third computing node 106 may include a third processing resource 112C and a third machine readable medium 114C.

Some features of the first computing node 102 may be analogous in many respects to corresponding features of the second and third computing nodes 104, 106. For example, the first processing resource 112A and the first machine readable medium 114A of the first computing node 102 may be analogous, in terms of hardware and/or functionality, to the processing resources 112B, 112C, the machine readable media 114B, 114C. Merely for clarity and convenience, features and components of the first computing node 102 have been be prefixed with the term "first," features and components of the second computing node 104 have been prefixed with the term "second," and features and components of the third computing node 106 have been prefixed with the term "third," without connoting sequence. Features and components of the first computing node 102 will now be described, and it may be appreciated and understood that such description may also apply to analogous features and components of the second computing node 104.

Non-limiting examples of the first processing resource 112A may include a microcontroller, a microprocessor, central processing unit core(s), an application-specific integrated circuit (ASIC), a field programmable gate array (FPGA), etc. The first machine readable medium 114A may be a non-transitory storage medium, examples of which include, but are not limited to, a random access memory (RAM), a read-only memory (ROM), an electrically erasable programmable read-only memory (EEPROM), a flash memory, a hard disk drive, etc. The first processing resource 112A may execute instructions (i.e., programming or software code) stored on the first machine readable medium 114A. Additionally or alternatively, the first processing resource 112A may include electronic circuitry for performing the functionality described herein.

Further, the first computing node 102 may include a hypervisor 116A. The hypervisor 116A may be a computer program, firmware, or a hardware that may facilitate hosting of multiple operating system instances on a common processing resource. Each operating system instance installed on the hypervisor 116A may be referred to as a virtual machine. Accordingly, the hypervisor 116A may provide a host operating system for the virtual machine. The hypervisor 116A may be type-1 hypervisor (also referred to as "bare-metal hypervisor") or type-2 (also referred to as "hosted hypervisor"). The type-1 hypervisor may be installed on the hardware (e.g., the processing resource 112A, the machine readable medium 114A) of the host computing node 102 without any intermediate operating system. The type-2 hypervisor may be installed on top of an operating system running on the host computing node 102 without any intermediate operating system. Also, the second computing node 104 and the third computing node 106 may respectively include a second hypervisor 116B and a third hypervisor 116C.

Moreover, the computing nodes 102, 104, and 106 may respectively include a first data store 118A, a second data store 118B, and a third data store 118C (hereinafter collectively referred to as data stores 118A-118D). The data stores 118B and 118C may be representative of an example of the data store 118A. The data stores 118A, 118B, and 118C may collectively form a distributed storage 118 that can be accessible by the computing nodes 102-106, 107 in the cluster 100. By way of example, the data stores 118A-118D and therefore the distributed storage 118 may represent a virtualized storage enabled by the respective hypervisors 116A-116D and may include aspects (e.g., addressing, configurations, etc.) abstracted from data stored in a physical storage (not shown). The distributed storage 118 may be presented to a user environment (e.g., to the virtual machines, an operating system, applications, processes, etc.) hosted on one or more of the computing nodes 102-106, 107. In some examples, the data stores 118A-118D may also provide data services such as deduplication, compression, replication, and the like.

The data stores 118A-118D may be object-based. For example, in the data stores 118A-118D, data may be stored as objects. For example, the data stores 118A, 118B, and 118C may include object stores 120A, 120B, and 120C, respectively. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index.

In some examples, the objects in the data stores 118A-118D may be hierarchically arranged. Such hierarchical arrangement of the objects may be referred to as a file system instance or a hive. For illustration purposes, although there may be more, the first data store 118A is shown to include one such file system instance—a first replica file system instance (RFSI) 122A (labeled in FIG. 1 as "$1^{ST}$ RFSI"). Objects in the first replica file system instance 122A may represent one or more objects stored in the object store 120A. One or more objects in given file system instance, e.g., 122A, may be related to a root object in an object tree (e.g., a Merkle tree) or any other hierarchical arrangement (e.g., directed acyclic graphs, etc.). In the case of the object tree, the lowest level tree node of any branch (that is, most distant from the root object) is a data object that stores user data, also referred to as a leaf data object. The parent tree node of the leaf data objects is a leaf metadata object that stores, as its content, the signatures of its child leaf data objects. The root and internal nodes of the object tree may also be metadata objects that store as content the signatures of child objects. A metadata object may be able to store a number of signatures that is at least equal to a branching factor of the hierarchical tree, so that it may hold the signatures of all of its child objects. In some instances, the file system instance 122A may be dedicated to an entity, such as a particular virtual machine or virtual controller, a user, or a client.

In some examples, to facilitate high-availability of the data, the distributed storage 118 may also include one or more replicas of a given file system instance. For instance, a replica of the file system instance 122A may be stored on the second data store 118B in the second computing node 104 as a second replica file system instance 122B (labeled in FIG. 1 as "$2^{ND}$ RFSI"). More particularly, the object stores 118A, 118B store the data whereas the file system instances 122A, 122B may merely refer to Merkle trees which are formed by linking content of signatures of the objects stored respectively in the data stores 118A, 118B. During operation, any update made in the first replica file system instance 122A is also reflected in the second replica file system instance 122B. Although not shown, the computing nodes 102-106 may also include several other file system instances dedicated to certain other virtual machines or databases and corresponding replica file system instances stored on a different computing nodes in the cluster 100.

In some implementations, the data stores 118A, 118B, and 118C may be implemented, maintained, and managed, at least in part, by one or more virtual controllers, such as, a first virtual controller 124A, a second virtual controller 124B, and a third virtual controller 124C, respectively. By way of example, the first virtual controller 124A may be implemented using hardware devices (e.g., electronic circuitry, logic, or processors) or any combination of hardware and programming (e.g., instructions stored on machine readable medium) to implement various functionalities described herein. For example, the first virtual controller 124A may be a virtual machine that includes, at least in part, instructions stored on the first machine readable medium 114A and executing on the first processing resource 112A. The virtual controllers 124B and 124C may be representative of an example of the first virtual controller 124A. The virtual controllers 124A, 124B, 124C may be hosted by the hypervisors 116A, 116B, and 116C, respectively.

In the present configuration of the cluster 100, even though two-way replication has been enabled by storing two replicas (122A, 122B) corresponding to a resource (e.g., a VM) in the cluster 100, the virtual controllers 124A, 124B, 124C may facilitate high-availability of data even in case of failure of a computing node (e.g., the second computing node 104). In accordance with some aspects of the present disclosure, if a computing node such as the second computing node 104 encounters a failure condition, the virtual controller 124A may initiate process for creating a sparse replica (e.g., a partial replica) file system instance on a third computing node 106. By way of example, such failure condition may include, but is not limited to, a separation of the second computing node 104 from the network 108, complete or partial failure, damage, and/or malfunctioning of the second computing node 104 or any internal components thereof such as the second virtual controller 124B, the second processing resource 112B, and the second machine readable medium 114B. In response to the detection of the failure condition, the sparse replica (e.g., a partial replica) file system instance 126 may be created in the data store 124C on a third computing node 106. Additional details of the operations performed by the virtual controllers 124A, 124B, and 124C will be described in conjunction with the sequence diagram 200 of FIG. 2.

Referring now to the sequence diagram 200, a bracket 201 indicates sequence of interactions among the computing nodes 102-106 during normal operation of the cluster 100. During the normal operation 201, at 202, a data update request may be received by the first virtual controller 124A from a client such as the hypervisor 116A. For example, the data update request may be a request to update data corresponding to a resource hosted on the first computing node 102, such as a VM or a database. By way of example, the data update request may include, but is not limited to, a data write request, a file creation request, a file deletion request, a file rename request, a file movement request, or combinations thereof.

Depending on particulars of the first data update request, the first virtual controller 124A may perform the requested update in the first data store 118A. For example, an update may be performed on the first replica file system instance 122A by the first virtual controller 124A. Moreover, to facilitate HA of data, the first virtual controller 124A may also send the first data update request to the second computing node 104 at 204. In particular, the first virtual controller 124A may perform the same update in the second replica file system instance 122B as performed on the first replica file system instance 122A. By doing so, the first virtual controller 124A maintains replicas of a file system instance as the first replica file system instance 122A stored on the first computing node 102 and the second replica file system instance 122B stored on the second computing node 104. Once the update is successfully performed on the second replica file system instance 122B, the second virtual controller 124B, at 205, may send a response to the first virtual controller 124A indicating the such successful completion of data update corresponding to the first data update request. Further, once the updates are successfully performed on b both the first replica file system instance 122A and the second replica file system instance 122B, the first virtual controller 124A may send a response indicating the completion of data update corresponding to the first data update request to the client at 206.

During operation, the second computing node 104 hosting the second replica file system instance 122B may encounter the failure condition at 210. In some examples, in a failure detection phase 207, the first virtual controller 124A may detect such failure condition associated with the second computing node 104 while serving a second data update request previously received at 208. For instance, at 212, as per a normal routine for replicating a data update on the second replica file system instance 122B, the first virtual controller 124A may discover that the second computing node 104 has failed (i.e., encountered the failure condition). In an example, the first virtual controller 124A may determine that the second computing node 104 has failed due to absence of any acknowledgement (in a predefined time duration) from the second virtual controller 124B for the second data update request sent by the first virtual controller 124A.

Due to the failure condition associated with the second computing node 104, no data update can be performed in the second data store 118B to update the second replica file system instance 122B. Whereas, in a similar situation, in the traditional systems, the first replica file system instance 122A would have entered into an "HA non-compliant" state due to failure of the second computing node 104, the cluster 100 of the present disclosure obviates such problem. In particular, in response to detection of the failure condition associated with the second computing node 104, the first virtual controller 124A may instruct, at 214, the third computing node 106 to create the sparse replica file system instance 126 in the third computing node 106. Accordingly, at 215, the third virtual controller 124C may create the sparse replica file system instance 126 in the third data store 118C. Once the sparse replica file system instance 126 is created in the third data store 118C, the third virtual controller 124C, at 216, may send a response indicating successful creation of the sparse replica file system instance 126 to the first virtual controller 124A. Further, the sparse replica file system instance 126 may be updated in accordance with the second data update request. Moreover, at 217, the first virtual controller 124A may communicate response indicative of the successful completion of operations corresponding to the second data update request to the client. Additional details of creation of the sparse replica file system instance 126 will be described in conjunction with FIGS. 3, 4A-4B, and 7.

Once the sparse replica file system instance 126 is created, in a phase marked as "sparse replica in operation" 218, the first virtual controller 124A may direct any new data update request to the first replica file system instance 122A on the first computing node 102 and the sparse replica file system instance 126 on the third computing node 106. For example, based on a third data update request received at 219, the first virtual controller 124A may update the first replica file system instance 122A. Further, at 220, the first virtual controller 124A may update the sparse replica file system instance 126 on the third computing node 106. Once the update is successfully performed on the sparse replica file system instance 126, the third virtual controller 124C, at 221, may send a response to the first virtual controller 124A indicating the such successful completion of data update corresponding to the fourth data update request. Further, once the data update is successfully completed on both the first replica file system instance 122A and the sparse replica file system instance 126, an acknowledgement or response may be sent to the client at 222.

In some examples, the sparse replica file system instance 126 may support the data update requests supported on normal replicas, such as the first and second replica file system instances 122A, 122B, so that HA compliance can be maintained. For instance, the sparse replica file system instance 126 may have a subset of the data, in particular, data updates after the failure of the second computing node 104. Therefore, in some instances, for data read operations, it may be acceptable for the sparse replica file system instance 126 to either return a response indicating "not implemented" or the data read request may be transferred to a normal replica that is online (e.g., the first replica file system instance 122A). Configuration wise, the sparse replica file system instance 126 may be similar to any of the first or second replica file system instances 122A, 122B. For example, the sparse replica file system instance 126 may be a directory tree and be accessible over NFS/SMB protocols. In some examples, all or at least some of the metadata operations and/or data are captured in the sparse replica file system instance 126. In some examples, if the size of the metadata is small, it is feasible to create the sparse replica file system instance 126 with all the metadata.

Referring again to FIG. 1, in a situation when the second computing node 104 recovers from the failure condition, the second virtual controller 124B may rebuild the second replica file system instance 122B based, at least partially, on the sparse replica file system instance 126, the first replica file system instance 122A, or a combination thereof. For example, when the second computing node 104 has recovered from the failure condition and the first computing node 102 had also encountered a failure condition, the second virtual controller 124B may rebuild the second replica file system instance 122B based on the sparse replica file system instance 126 (described in FIGS. 4B and 8). Alternatively, if the second computing node 104 has recovered from the failure condition while the first computing node 102 is operating normally, the second virtual controller 124B may rebuild the second replica file system instance 122B based on the first replica file system instance 122A. Additional details of rebuilding the second replica file system instance 122B will be described in conjunction with FIGS. 4B and 8.

As will be appreciated, since the sparse replica file system instance 126 stores a sub-set of updates, use of such sparse replica file system instance 126 may utilize reduced storage space, CPU time, and networking overhead in comparison to full 3-way or n-way replication (n>3). Also, the DU and/or DL conditions may be prevented. Moreover, use of such sparse replica file system instance 126 may also prevent a resource such as a VM from entering an "HA non-compliant" state, thereby preventing unnecessary notifications to the users or administrators thereof.

Figure 3:
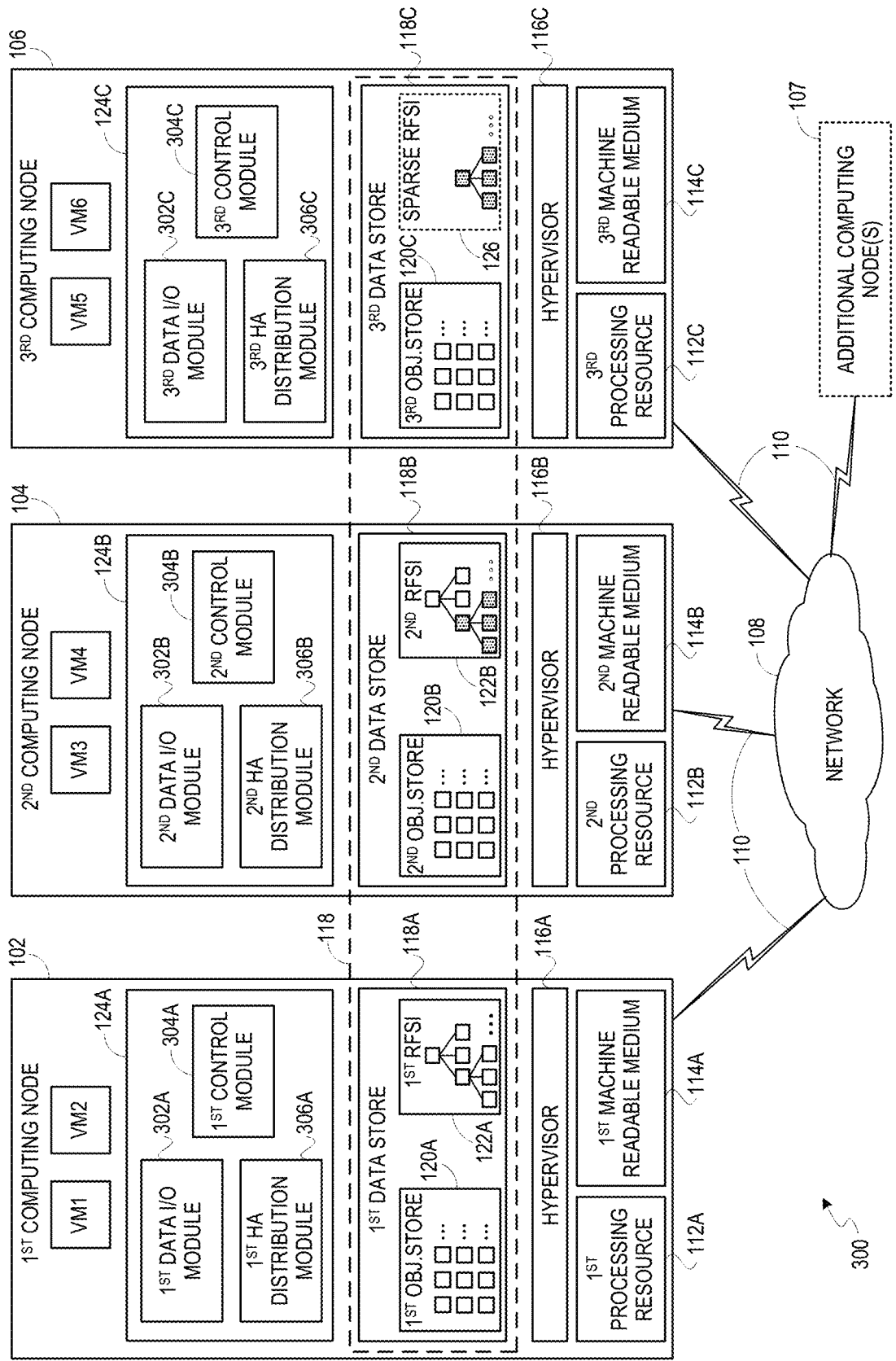
FIG. 3 illustrates a cluster of computing nodes, in accordance with another example.

FIG. 3 illustrates a cluster 300 of computing nodes, in accordance with another example. In particular, the cluster 300 of FIG. 3 may be representative of an example of the cluster 100 of FIG. 1 and includes certain features that are already described in FIG. 1. For example, the cluster 300 also includes the first computing node 102, the second computing node 104, and the third computing node 106 coupled to each other via the network 108. In some examples, the cluster 300 may also include one or more additional computing nodes 107. Certain description of these components and features is not repeated herein. Also, for ease of explanation, FIG. 3 is described along with FIGS. 4A-4B which collectively depict a sequence diagram 400 showing example interactions among the computing nodes 102-106 in the cluster 300 of FIG. 3 to maintain high-availability of the file system instance, in accordance with another example.

The computing nodes 102-106 in FIG. 3 are shown to include one or more VMs—sometimes also referred to as guest VMs. For example, in the present configuration of the cluster 300, each of the computing nodes 102-106 are shown to include two VMs. For instance, the first computing node 102 may include virtual machines VM1 and VM2 which are hosted by the first hypervisor 116A. Similarly, the second computing node 104 may include virtual machines VM3 and VM4 which are hosted by the second hypervisor 116B. Moreover, the third computing node 106 may include virtual machines VM5 and VM6 which are hosted by the third hypervisor 116C.

In FIG. 3, the virtual controllers 124A, 124B, 124C are shown to include internal modules such as data input/output (I/O) module, control module, and HA distribution module. In particular, the first virtual controller 124A includes a first data I/O module 302A, a first control module 304A, and a first HA distribution module 306A. Similarly, the second virtual controller 124B also includes a second data I/O module 302B, a second control module 304B, and a second HA distribution module 306B. Moreover, the third virtual controller 124C also includes a third data I/O module 302C, a third control module 304C, and a third HA distribution module 306C. It is to be noted that the data I/O modules 302B and 302C may be representative of an example of the first data I/O module 302A. Similarly, the control modules 304B and 304C may be representative of an example of the first control module 304A. Also, the HA distribution modules 306B and 306C may be representative of an example of the first HA distribution module 306A. Accordingly, features and components of the first virtual controller 124A will now be described, and it may be appreciated and understood that such description may also apply to analogous features and components of the second and third virtual controllers 124B, 124C.

In some examples, the first data I/O module 302A, the first control module 304A, and the first HA distribution module 306A may each be computer program modules, where program instructions implementing these program modules are stored within the first machine readable medium 114A and are executable by the first processing resource 112A. In certain other examples, the modules 302A, 304A, and 306A may be implemented using one or more processors, one or more microcontrollers, and/or electronic circuits which may perform various functions for the intended use of the first virtual controller 124A.

The first data I/O module 302A may be implemented based on NFS and/or SMB protocols and may act as protocol end points for incoming data update requests and provides global cluster-wide namespace. The first data I/O module 302A may forward incoming data update requests to the first HA distribution module 306A. The first HA distribution module 306A along with the first control module 304A may create and/or update two replica file system instances such as the first replica file system instance 122A and the second replica file system instance 122B to facilitate HA of data. As noted earlier, while the first replica file system instance 122A is stored in the first data store 118A on the first computing node 102, the second replica file system instance 122B is stored in the second data store 118B on the second computing node 104.

Further, the first control module 304A may maintain a list of computing nodes and corresponding replica file system instances. In some examples, such list of the computing nodes and corresponding replica file system instances may be stored in a configuration database (not shown) locally on the first computing node 102. The control modules 304B and 304C may also maintain such configuration databases in the respective host computing nodes 104, 106. The configuration databases hosted on the computing nodes 104, 106 may be synchronized with the configuration database stored in the first computing node 102.

Moreover, the first control module 304A may also maintain a current state of all the replica file system instances in a cluster-wide, consistent version database. The version database may be updated using a consensus protocol such as a Paxos protocol. For example, in the version database each of the replica file system instance is assigned a state that includes a monotonically increasing version number, called the "treeVersion". The treeVersions of the replica file system instances remain synchronized during a normal operation of the cluster 300. The treeVersions of the replica file system instances may not be synchronized as a result of one or more computing nodes encountering a failure condition. In some examples, the first HA distribution module 306A along with the first control module 304A may increment the treeVersions for all replica file system instances in response to one or more of a change in an ownership of the replica file system instances, one or more computing nodes encountering the failure condition, failure of any update on any replica file system instance.

Figure 4B:
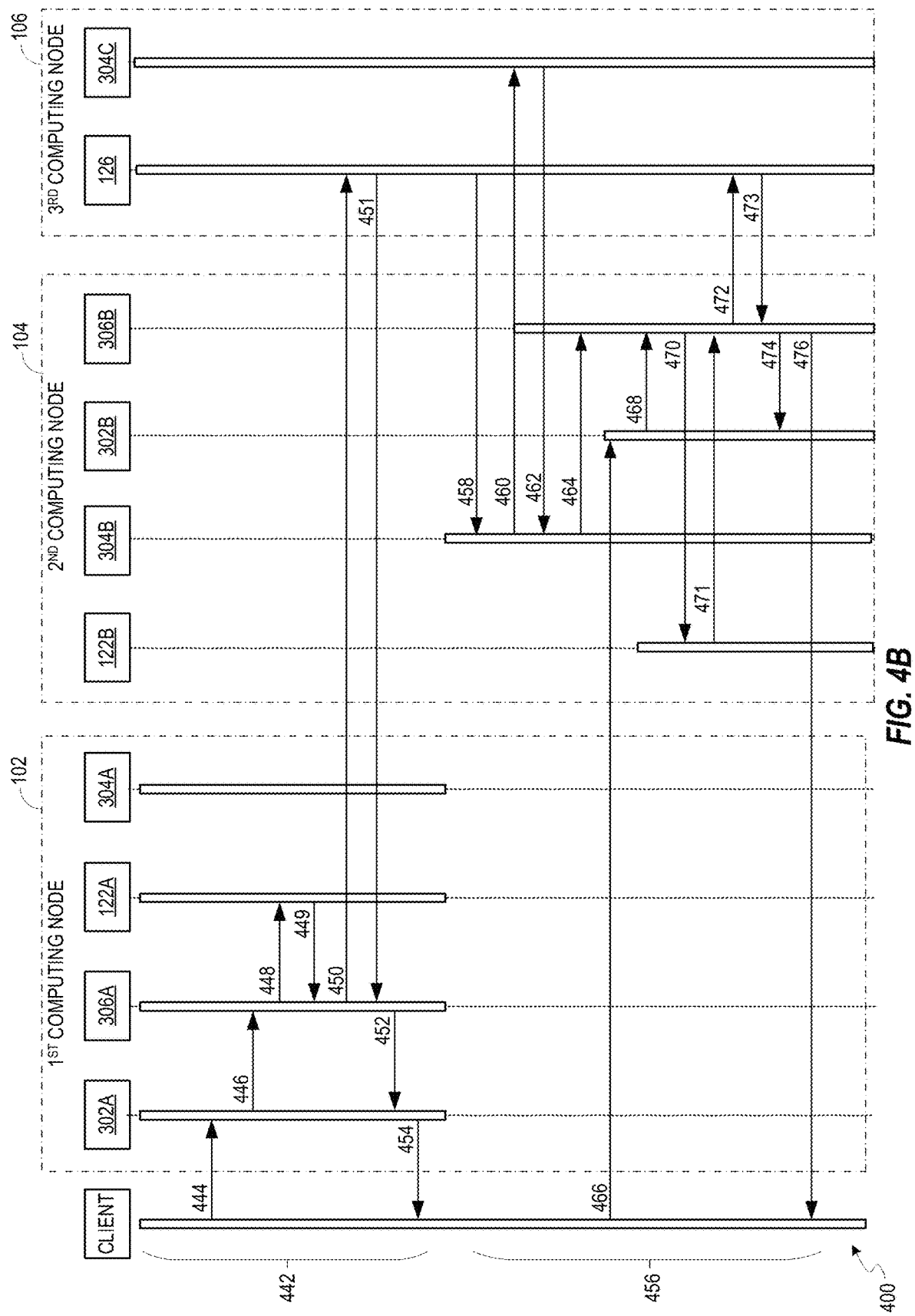

Various other aspects of the operations performed by one or more of the virtual controllers 124A-124O will be described in conjunction a sequence diagram 400 depicted in FIGS. 4A-4B. As shown in FIG. 4A, during the normal operation 402 of the cluster 300, at 404, a first data update request corresponding to a resource, such as, the virtual machine VM1, hosted on the first computing node 102 may be received by the first virtual controller 124A from a client such as the hypervisor 116A. In particular, the first data update request may be received by the first data I/O module 302A.

Further, at 406, the first data I/O module 302A may forward the first data update request to the first HA distribution module 306A. The first HA distribution module 306A may in-turn distribute the first data update request to the first replica file system instance 122A on the first computing node 102 and the second replica file system instance 122B on the second computing node 104. For example, at 408, an update in accordance with the first data update request may be performed on the first replica file system instance 122A. Further, at 410, an update similar to the one performed on the first replica file system instance 122A may also be performed on the second replica file system instance 122B. Once the update is successfully performed on the second replica file system instance 122B, the second virtual controller 124B, at 411, may send a response to the first virtual controller 124A indicating the such successful completion of data update on the second replica file system instance 122B. Accordingly, both the replica file system instances 122A, 122B may maintain the same data as long as they are updated in synchronization so that HA of data many be facilitated via such replica file system instances 122A, 122B. Once both the replica file system instances 122A, 122B are updated in accordance with the first data update request, at 412, the first HA distribution module 306A may send a confirmation to the first data I/O module 302A. Further, at 414, the first data I/O module 302A acknowledges completion of the update corresponding to the first data update request to the client.

In some instances, the second computing node 104 may encounter a failure condition (described earlier). In some examples, the first virtual controller 124A may detect such failure condition associated with the second computing node 104 while serving a second data update request. By way of example, the second data update request may have been received by the first data I/O module 302A, at 416, during the normal operation 402 of the cluster 300. For instance, as per a normal routine for replicating the data updates, the first data I/O module 302A may forward, at 418, the second data update request to the first HA distribution module 306A.

Further, the first HA distribution module 306A may distribute the second data update request to the first replica file system instance 122A and the second replica file system 122B. For example, at 420, an update in accordance with the first data update request may be performed on the first replica file system instance 122A. Further, at 422, while an updated is attempted on the second replica file system instance 122B, the update may not succeed due to the failure condition associated with the second computing node 104. In particular, the second computing node 104 might have encountered the failure condition at the time (e.g., at 421) of receipt of the request at 422 or prior to 422 but after 410. Since, the second computing node 104 has encountered the failure condition, the first HA distribution module 306A may not receive any acknowledgement in response to the request sent at 422. In some examples, after waiting for a predefined period of time, the first HA distribution module 306A may communicate, at 426, information about the failure of the second computing node 104 to the first control module 304A. The predefined period of time may be customizable.

Furthermore, in response to such detection of the failure condition associated with the second computing node 104, the first virtual controller 124A, at 428, may identify a first snapshot of the second replica file system instance 122B. The term "snapshot" as used herein may refer to a point-in-time copy of the data associated with a given file system instance. By way of example, if the given file system instance is dedicated to a virtual machine VM1, the snapshot may include information such as a data state such as powered off, powered on and suspended, corresponding to the virtual machine VM1.

The first control module 304A of the first virtual controller 124A may identify the first snapshot which may be the latest snapshot of the second replica file system instance 122B captured when the second replica file system instance 122B was up-to-date with the first replica file system instance 122A. For instance, the first control module 304A, periodically or on request, captures snapshots of the replica file system instances 122A and 122B and stores such snapshots in the distributed storage 118. The first control module 304A may retrieve the latest snapshot of the second replica file system instance 122B from the stored snapshots in the first data store 118A.

Moreover, at 430, the first virtual controller 124A may capture a second snapshot of the first replica file system instance 122A on the first computing node 102. By way of example, the first control module 304A of the first virtual controller 124A may capture the second snapshot of the first replica file system instance 122A and stores the second snapshot in the distributed storage 118, for example, in the data store 118A. In some instances, the second snapshot of the first replica file system instance 122A may be captured after detection of the failure of the second computing node 104.

In some examples, at 432, the first virtual controller 124A may instruct the third computing node 106 to create a sparse replica file system instance in the third computing node 106. For instance, the first control module 304A may send a request to the third control module 304C to create the sparse replica file system instance 126. In some examples, in the request, the first control module 304A may communicate the first snapshot and the second snapshot to the third computing node 106. In some other examples, in the request, the first control module 304A may communicate a difference between the first snapshot and the second snapshot to the third computing node 106 at 433. By way of example, the difference between the first snapshot and the second snapshot may include any update made on the first file system instance in a time duration between the failure of the second computing node 104 and a receipt of a data update request currently being served. In certain examples, the first control module 304A may communicate the first snapshot, the second snapshot, as well as the difference between the first snapshot and the second snapshot to the third computing node 106.

In accordance with the instructions or request received from the first virtual controller 124A, the third control module 304C of the third virtual controller 124C may create the sparse replica file system instance 126 at 434. In particular, the sparse replica file system instance 126 is created such that a tree structure of the sparse replica file system instance 126 starts from a content of the difference between the first snapshot and the second snapshot. In some examples, the sparse replica file system instance 126 may start may start with the first snapshot as a base or foundation. It is understood that the second replica file system instance 122B was synchronized with the first replica file system instance 122A when the first snapshot was taken. The sparse replica file system instance 126 may be stored in the third data store 118C on the third computing node 106. In some examples, the difference between the first snapshot and the second snapshot may be sent to the third computing node 106 after 432. In which case, the difference between the first snapshot and the second snapshot may be stored separately from the replica file system 126 in the third data store 118C on the third computing node 106.

Once the sparse replica file system instance 126 is created on the third computing node 106, at 436, the first control module 304A may send a notification to the first HA distribution module 306A that the sparse replica file system instance 126 has been created on the third computing node 106. Accordingly, after the confirmation of creation of the sparse replica file system instance 126, the first HA distribution module 306A may consider communicating future data update requests to the sparse replica file system instance 126 instead of the second replica file system instance 122B. Further, at 438, the first HA distribution module 306A may send a response to the first data I/O module 302A. Finally, at 440, the first data I/O module 302A may issue the response to the second data update request to the client. The sequence of operations from 422 through 440 are collectively referred to as a sparse replication phase 441.

Referring now to FIG. 4B, in section 442, operation of the cluster 300 is described when the second computing node 104 has failed and the sparse replica file system instance 126 is created. The section 442 may also be referred as sparse replica in operation phase. As will be appreciated, once the sparse replica file system instance 126 is created, the first virtual controller 124A may direct any new data update request to the first replica file system instance 122A on the first computing node 102 and the sparse replica file system instance 126 on the third computing node 106.

By way of example, at 444, a third data update request may be received by the first data I/O module 302A. At 446, the first data I/O module 302A may forward the third data update request to the first HA distribution module 306A. The first HA distribution module 306A may in-turn distribute the third data update request to the first replica file system instance 122A on the first computing node 102 and the sparse replica file system 126 on the third computing node 106. For example, at 448, an update in accordance with the third data update request may be performed on the first replica file system instance 122A. At 449, an acknowledgement may be sent to the first HA distribution module 306A upon successful completion of the update on the first replica file system instance 122A. Further, at 450, an update similar to the one performed on the first replica file system instance 122A may also be performed on the sparse replica file system instance 126. At 451, an acknowledgement may be sent to the first HA distribution module 306A upon successful completion of the update on the sparse replica file system instance 126. Once both the first replica file system instance 122A and the sparse replica file system instance 126 are updated in accordance with the third data update request, the first HA distribution module 306A may send an update confirmation to the first data I/O module 302A at 452. Further, at 454, the first data I/O module 302A acknowledges completion of the update corresponding to the third data update request to the client. Although, the interactions 448-452 are shown in a particular order in FIG. 4, in some examples, the interactions 448-452 may occur in any suitable order.

Moreover, during operation of the cluster 300, the second computing node 104 may recover from the failure condition either automatically or via a manual repair or intervention. Once recovered, the second virtual controller 124B may rebuild the second replica file system instance 122B based at least partially on the sparse replica file system instance 126, the first replica file system instance 122A, or a combination thereof. In some examples, if the second computing node 104 recovers from the failure condition while the first computing node 102 operates normally, the second virtual controller 1246 may rebuild the second replica file system instance 122B based on the first replica file system instance 122A. In some examples, the rebuilding of the second replica file system instance 122B may include applying a difference between the first replica file system instance 122A and the second replica file system instance 122B to the second replica file system instance 122B, thereby making the second replica file system instance 122B identical to the first replica file system instance 122A. In some other examples, the rebuilding of the second replica file system instance 122B may include copying the entire content of the first replica file system instance 122A in the second data store 1186 as into the second replica file system instance 122B, thereby making the second replica file system instance 122B identical to the first replica file system instance 122A.

In some examples, while the second computing node 104 has recovered from the failure condition, the first computing node 102 might have encountered a failure condition. For instance, a section 456 may indicate an operation of the cluster 300 when the second computing node 104 has recovered from the failure condition but the first computing node 102 had encountered the failure condition. The section 456 may also be referred to as a replica rebuild phase. In accordance with some aspects of the present disclosure, the second virtual controller 124B may rebuild the second replica file system instance 122B based on the sparse replica file system instance 126 stored on the third computing node 106 at 458.

To rebuild the second replica file system instance 122B at 458, a difference between the first snapshot and the second snapshot may be received by the second virtual controller 124B from the third computing node 106. More particularly, the second control module 304B may receive the difference between the first snapshot and the second snapshot from the sparse replica file system instance 126. Also, at 458, the second control module 304B may receive the sparse replica file system instance 126 from the third computing node 106. Thereafter, the second control module 304B may update the second replica file system instance 122B based on the sparse replica file system instance 126 and the difference between the first snapshot and the second snapshot. In particular, the second control module 304B may apply the difference between the first snapshot and the second snapshot and the sparse replica file system instance 126 to the second replica file system instance 122B, thereby making the second replica file system instance 122B identical to the first replica file system instance 122A. In some examples, the difference between the first snapshot and the second snapshot is applied to the second replica file system instance 122B prior to applying the sparse replica file system instance 126 to the second replica file system instance 122B.

Moreover, in some examples, the second control module 304B may also capture a third snapshot of the second replica file system instance 122B on the second computing node 104 after rebuilding the second replica file system instance 122B. The third snapshot of the second replica file system instance 122B may be stored in the second data store 118B in the second computing node 104. Additionally, at 460, the second control module 304B may copy the third snapshot of the second replica file system instance 122B to the third control module 304C of the third computing node 106. In response, the third control module 304C may update the sparse replica file system instance 126. In particular, the sparse replica file system instance 126 is updated such that the sparse replica file system instance 126 starts as a delta or difference from the third snapshot and all the previous entries in the sparse replica file system instance 126 are removed or deleted, thereby saving storage space in the third computing node 106.

Thereafter, at 462, the third control module 304C may send a response to the second control module 304B indicating such update on the sparse replica file system instance 126. At 464, the second control module 304B may further update the second data I/O module 302B about the operational status of the sparse replica file system instance 126 and the second replica file system instance 122B so that any upcoming data update request may be directed thereto.

Since the second replica file system instance 122B is rebuilt and the sparse replica file system instance 126 has also been updated, any new data update requests may be served by the second computing node 104. In particular, the second computing node 104 may takeover or assigned ownership of the second replica file system instance 122B and the sparse replica file system instance 126. By way of example, a new data update request such as a fourth data update request may be received by the second data I/O module 302B at 466.

At 468, the second data I/O module 302B may forward the fourth data update request to the second HA distribution module 306B. The second HA distribution module 306B may in-turn distribute the fourth data update request to the second replica file system instance 122B and the sparse replica file system 126. For example, at 470, an update in accordance with the fourth data update request may be performed on the second replica file system instance 122B. At 471, an acknowledgement indicative of successful completion of the update on the second replica file system instance 122B may be communicated to the second HA distribution module 306B. Further, at 472, an update similar to one performed on the second replica file system instance 122B may also be performed on the sparse replica file system instance 126. In response, at 473, an acknowledge indicative of the successful completion of the update on the sparse replica file system instance 126 may be communicated to the second HA distribution module 306B. Once both the second replica file system instance 122B and the sparse replica file system instance 126 are updated in accordance with the fourth data update request, at 474, the second HA distribution module 306B may send an update confirmation to the second data I/O module 302B. Further, at 476, the second data I/O module 302B acknowledges completion of the update for the fourth data update request to the client.

Figure 5:
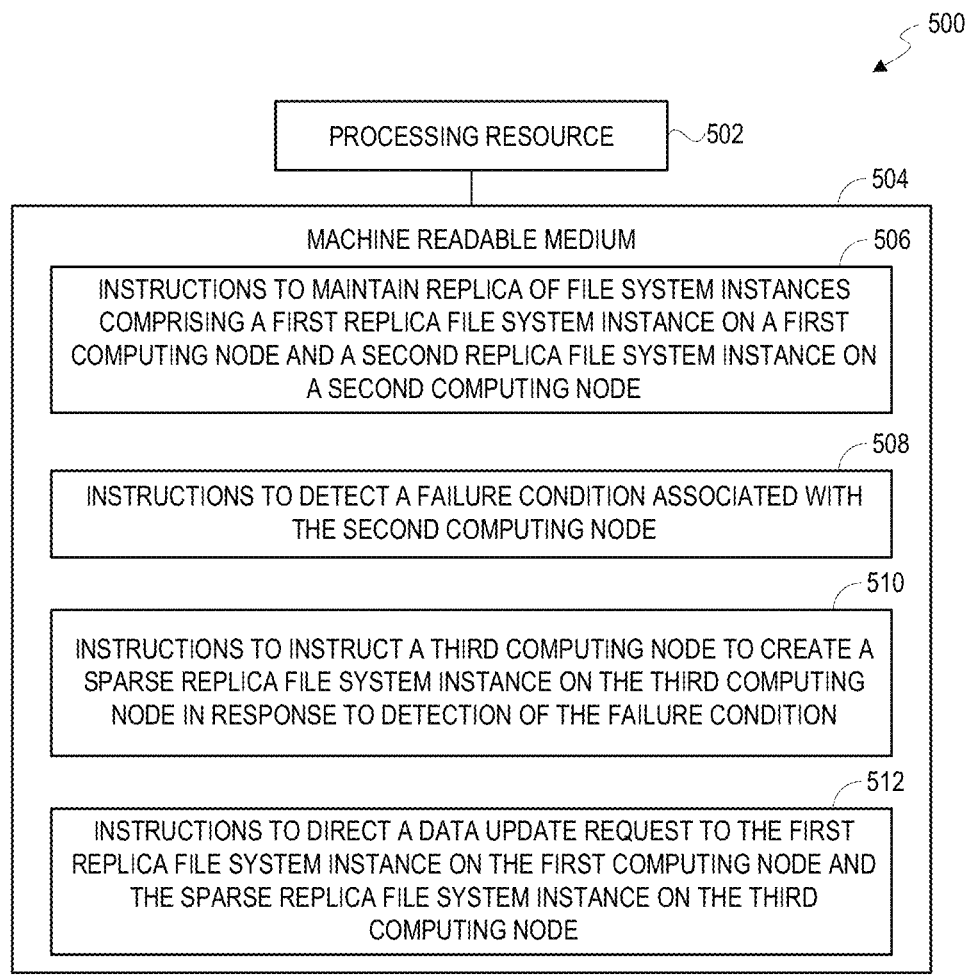
FIG. 5 is a block diagram depicting a processing resource and a machine readable medium encoded with example instructions to maintain high-availability of a file system instance, in accordance with an example.

FIG. 5 is a block diagram 500 depicting a processing resource 502 and a machine readable medium 504 encoded with example instructions to maintain high-availability of a file system instance, in accordance with an example. The machine readable medium 504 is non-transitory and is alternatively referred to as a non-transitory machine readable medium 504. In some examples, the machine readable medium 504 may be accessed by the processing resource 502. The processing resource 502 and the machine readable medium 504 may be included in computing nodes, such as the computing nodes 102-106, of the clusters 100, 300. By way of example, the processing resource 502 may serve as or form part of the processing resources 112A, 112B, and/or 112C. Similarly, the machine readable medium 504 may serve as or form part of the machine readable media 114A, 114B, and/or 114C.

The machine readable medium 504 may be encoded with example instructions 506, 508, 510, and 512. The instructions 506, 508, 510, and 512 of FIG. 5, when executed by the processing resource 502, may implement various aspects of maintaining high-availability of a file system instance. In particular, the instructions 506, 508, 510, and 512 of FIG. 5 may be useful for performing the functionalities of the first virtual controller 124A and the methods described in FIGS. 6-8. For example, the first virtual controller 124A may be executing on the processing resource 112A.

The instructions 506, when executed, may cause the processing resource 502 to maintain replica file system instances such as the first replica file system instance 122A on the first computing node 102 and the second replica file system instance 122B on the second computing node 104. Further, in some implementations, the instructions 508, when executed, may cause the processing resource 502 to detect a failure condition associated with the second computing node 104, for example. Furthermore, the instructions 510, when executed, may cause the processing resource 502 to instruct the third computing node 106 to create the sparse replica file system instance 126 in the third computing node 106 in response to detection of the failure condition associated with the second computing node 104. Moreover, the instructions 512, when executed, may cause the processing resource 502 to direct a data update request to the first replica file system instance 122A on the first computing node 102 and the sparse replica file system instance 126 on the third computing node 106. In particular, the instructions 506-512 may include various instructions to execute at least a part of the methods described in FIGS. 6-8 (described later). Also, although not shown in FIG. 5, the machine readable medium 504 may also include additional program instructions to perform various other method blocks described in FIGS. 6-8.

Figure 6:
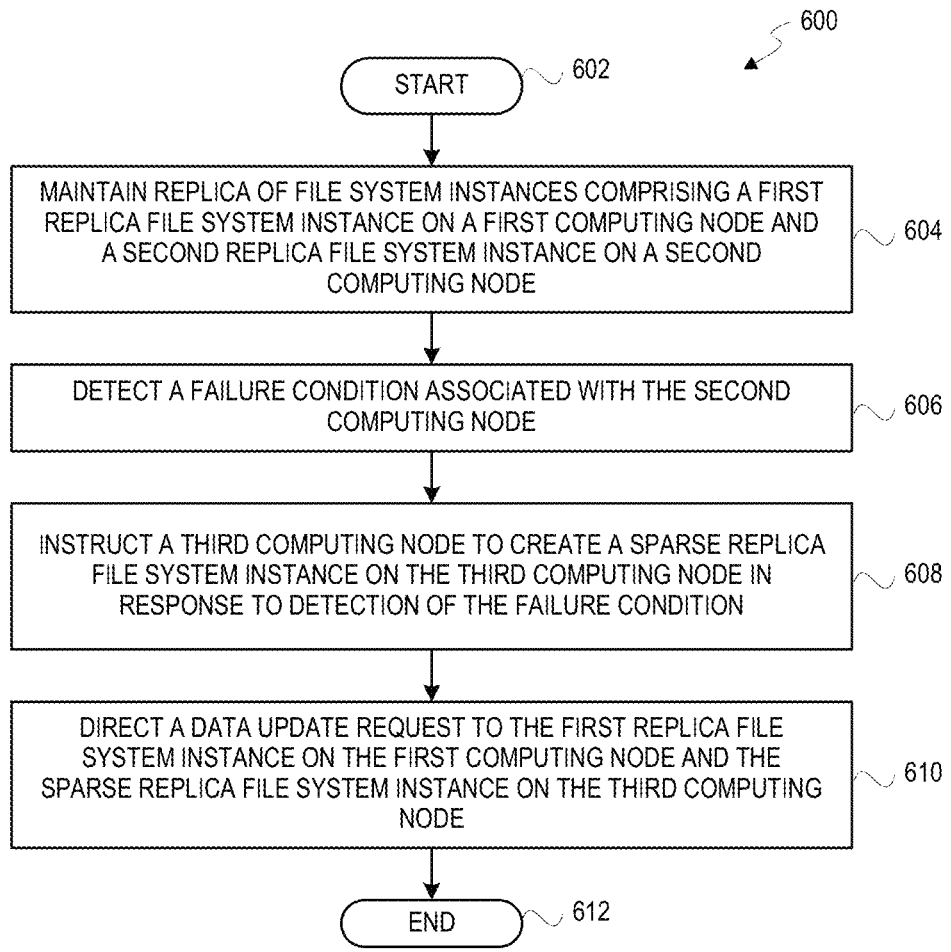
FIG. 6 is a flow diagram depicting a method to maintain high-availability of a file system instance, in accordance with an example.

FIG. 6 is a flow diagram depicting a method 600 to maintain high-availability of a file system instance, in accordance with an example. For ease of illustration, the method 600 will be described with reference to FIG. 1. The method 600 starts at block 602 and moves to block 604. At block 604, the method 600 includes maintaining, by a processor based system such as the first virtual controller 124A, replica file system instances. By way of example, the first virtual controller 124A may maintain the first replica file system instance 122A on the first computing node 102 and the second replica file system instance 122B on the second computing node 104. In an example, maintaining the replica file system instances includes creating and/or updating the replica file system instances 122A and 122B. For instance, when a virtual machine is installed or created, corresponding replica file system instances such as the replica file system instances 122A and 122B may also be created. Further, in some examples, maintaining the replica file system instances includes updating the replica file system instances 122A and 122B based on any data update request. For instance, when a data write request is received by the first virtual controller 124A, the first virtual controller 124A may update both the replica file system instances 122A and 122B.

The second computing node 104 may encounter a failure condition (described earlier). In some examples, the first virtual controller 124A may monitor the second computing node 104 to detect any failure condition associated with the second computing node 104. In some examples, monitoring by the first virtual controller 124A includes monitoring any acknowledgement or response from the second virtual controller 124B for any request sent from the first virtual controller 124A. If first virtual controller 124A does not receive the acknowledgement or response from the second virtual controller 124B in a predefined time duration, the first virtual controller 124A may determine that there exists the failure condition with the second computing node 104 or the second computing node 104 has failed, as indicated at block 606.

Further, at block 608, the first virtual controller may instruct the third computing node 106 to create the sparse replica file system instance 126 in the third computing node 106 in response to detection of the failure condition at block 606. Accordingly, the third virtual controller 124C may create the sparse replica file system instance 126 in the third data store 118C. Various additional details of instructing the third computing node 106 have been described in conjunction with FIGS. 4A and 7.

As previously noted, the sparse replica file system instance 126 may store only partial data. For instance, the sparse replica file system instance 126 may be updated such that any new updates which are supposed to be made on the second replica file system instance 122B will now be made on the sparse replica file system instance 126. For example, at block 610, the first virtual controller 124A may direct a data update request (i.e., a data update request received after creation of the sparse replica file system instance 126) to the first replica file system instance 122A on the first computing node 102 and the sparse replica file system instance 126 on the third computing node 106. The method ends at block 612. Certain additional details of these blocks 604-610 and some more additional method blocks will be described in conjunction with a detailed flow chart in FIG. 7.

Figure 7:
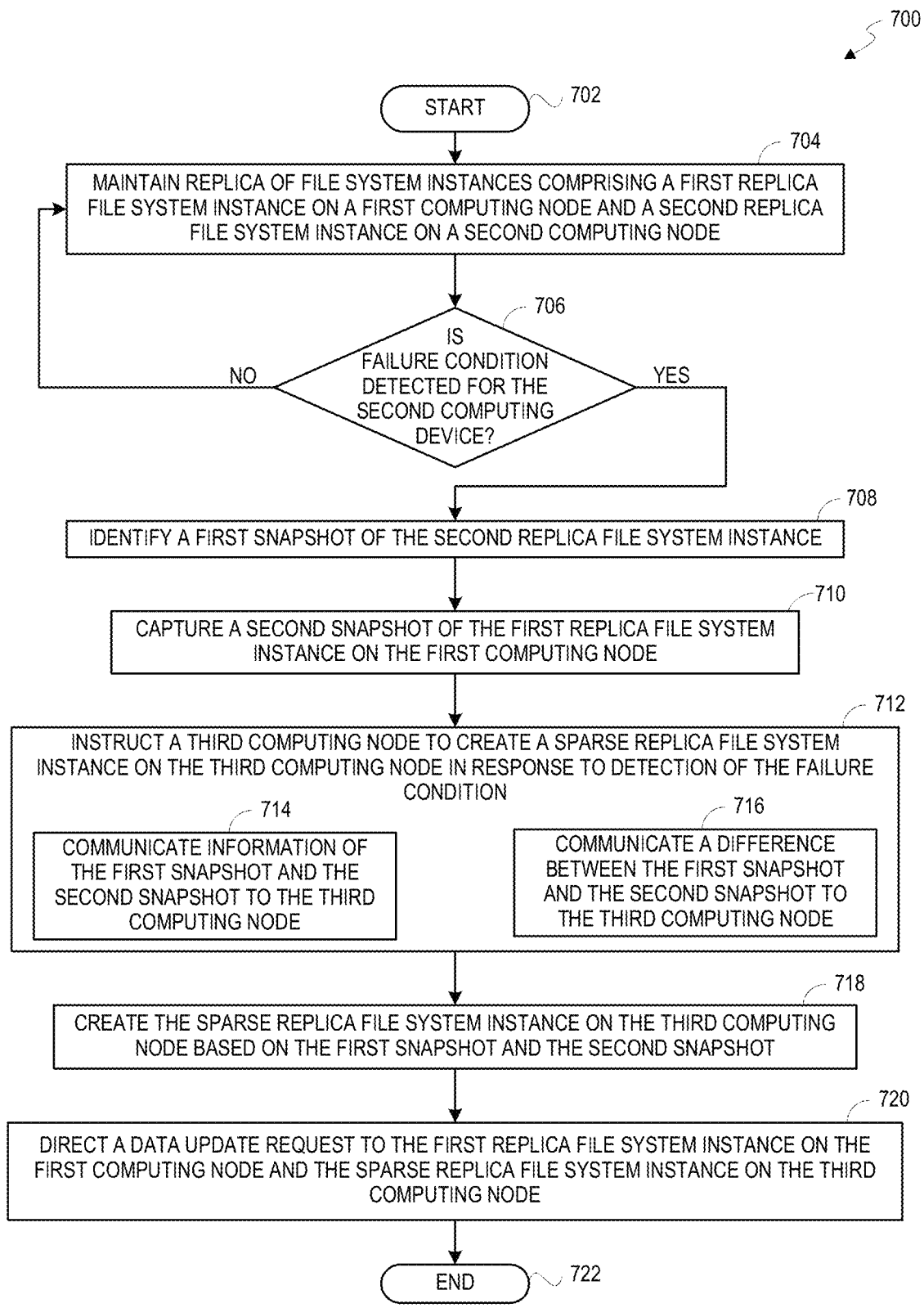
FIG. 7 is a flow diagram depicting a method for maintaining high-availability of a file system instance, in accordance with another example.

Turning now to FIG. 7, a flow diagram depicting a method 700 to maintain high-availability of a file system instance is presented, in accordance with another example. FIG. 7 will be described in conjunction with the cluster 300 of FIG. 3. The method 700 starts at block 702 and move to block 704.

At block 704, the method 700 includes maintaining, by a processor based system such as the first virtual controller 124A, replica file system instances such as the first replica file system instance 122A on the first computing node 102 and the second replica file system instance 122B on the second computing node 104. The method block 704 may be an example of block 604 of FIG. 6. Further, at block 706, the first virtual controller 124A may monitor the second computing node 104. The block 706 may be an example of block 606 of FIG. 6. By way of example, at block 706, the first control module 304A or the first HA distribution module 306A may monitor the second computing node 104 to detect any failure condition associated with the second computing node 104. As previously noted, in some examples, monitoring by the first HA distribution module 306A may include monitoring any acknowledgement or response from the second virtual controller 124B in response to any request sent from the first virtual controller 124A.

At block 706, if first control module 304A or the first HA distribution module 306A receives the acknowledgement or response from the second virtual controller 124B, the first control module 304A or the first HA distribution module 306A continues to maintain the replica file system instances. However, at block 706, if the first control module 304A does not receive the acknowledgement or response from the second virtual controller 124B in a predefined time duration, the first control module 304A may determine that there exists the failure condition with the second computing node 104 or the second computing node 104 has failed (see sequence at 422 in FIG. 4) and continues to execute block 708.

At block 708, the method 700 may include identifying a first snapshot of the second replica file system instance 122B. As noted at sequence 428, The first snapshot may be a latest snapshot of the second replica file system instance 122B captured when the second replica file system instance 122B was up-to-date with the first replica file system instance 122A. The first control module 304A may retrieve the latest snapshot of the second replica file system instance 122B from the stored snapshots in the first data store 118A. Moreover, at block 710, the method 700 includes capturing a second snapshot of the first replica file system instance 122A on the first computing node 102.

Once the first and second snapshots are available, at block 712, the first virtual controller 124A, may instruct the third computing node 106 to create the sparse replica file system instance 126 in the third computing node 106. The block 712 may be an example of the block 608 of FIG. 6. In particular, the first control module 304A may send a request to the third control module 304C to create the sparse replica file system instance 126. The block 712 may include performing one or both of method blocks 714 or 716. In some examples, at block 714, the first control module 304A may communicate information of the first snapshot and the second snapshot to the third computing node 106. For instance, at block 714, information such as content, metadata, or both the content and the metadata of the first snapshot and the second snapshot may be communicated to the third computing node 106. In some other instances, a copy of the first snapshot and a copy of the second snapshot may be communicated to the third computing node 106. In some other examples, at block 716, the first control module 304A may communicate a difference between the first snapshot and the second snapshot to the third computing node 106.

Accordingly, at block 718, the sparse replica file system instance may be created on the third computing node 106 based on the first snapshot and the second snapshot. In particular, the third control module 304C of the third virtual controller 124C may create the sparse replica file system instance 126 such that a tree structure of the sparse replica file system instance 126 begins from the second snapshot. Accordingly, after confirmation of creation of the sparse replica file system instance 126, the first HA distribution module 306A may consider communicating future data update requests to the sparse replica file system instance 126 instead of the second replica file system instance 122B.

For example, at block 720, any new data update request received after the creation of the sparse replica file system instance 126 may be directed to the first replica file system instance 122A and the sparse replica file system instance 126. For example, for a data update request such as the third data update request updates may be made on the first replica file system instance 122A and the sparse replica file system instance 126 by the first HA distribution module 306A (see sequences 448 and 450 in FIG. 4). The method ends at block 722.

Figure 8:
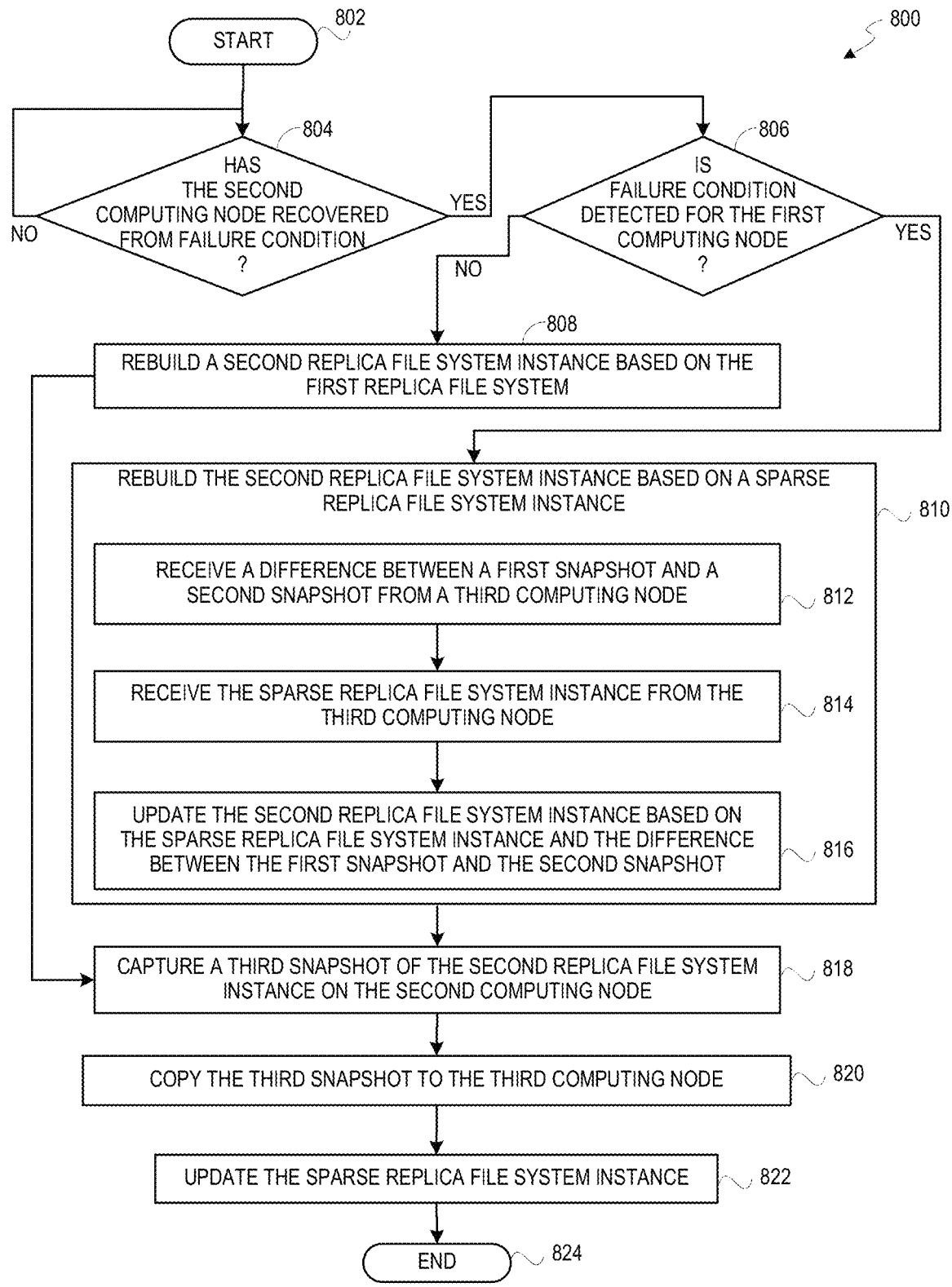
FIG. 8 is a flow diagram depicting a method for rebuilding a file system instance based on a sparse replica file system instance, in accordance with an example.

During operation of the cluster 300, the second computing node 104 may recover from the failure condition either automatically or via a manual repair or intervention. Once recovered, the second virtual controller 124B may rebuild the second replica file system instance 122B based at least partially on the sparse replica file system instance 126, the first replica file system instance 122A, or a combination thereof. In some examples, while the second computing node 104 has recovered from the failure condition, the first computing node 102 might have encountered a failure condition. FIG. 8 represents one such method of rebuilding the second replica file system instance 122B, in accordance with an example.

The method 800 starts at block 802 and continues to execute block 804. At block 804, a check may be performed by the first virtual controller 124A to determine whether the second computing node 104 has recovered from a failure condition. If, at block 804, it is determined that the second computing node 104 has not been recovered from the failure condition, the block 804 will be executed again. However, at block, 804, if it is determined that the second computing node 104 has recovered from the failure condition, another check may be performed at block 806. At block 806, a check may be performed by the second virtual controller 124B to determine if a failure condition is detected for the first computing node 102. If, at block 806, no failure condition is detected for the first computing node 102 it is considered that the computing node 102 is operating normally and method at block 808 will be executed. In some alternative examples, although not indicated in FIG. 8, at block, 804, if it is determined that the second computing node 104 has recovered from the failure condition, the method at block 808 will be executed. Also, in some examples, the checks at blocks 804 and 806 may be performed simultaneously. In certain example, execution of method at block 806 may begin before completion of execution of block 804. However, in some other examples, execution of method at block 804 may begin before completion of execution of block 806.

At block 808, the method 800 may include rebuilding the second replica file system instance 122B based on the first replica file system instance 122A. In some examples, to rebuild to the second replica file system instance 122B at block 808, the second virtual controller 124B may apply a difference between the first replica file system instance 122A and the second replica file system instance 122B to the second replica file system instance 122B, thereby making the second replica file system instance 1226 identical to the first replica file system instance 122A. In some other examples, at block 808, the second virtual controller 1246 may copy the entire content of the first replica file system instance 122A in the second data store 118B as the second replica file system instance 122B, thereby making the second replica file system instance 122B identical to the first replica file system instance 122A. A method at block 818 will be executed after the execution of block 808.

Further, if the failure condition has been detected for the first computing node 102 at block 806, the second virtual controller 124B may determine that the first computing node 102 has failed and block 810 will be executed. At block 810, the second virtual controller 124B may rebuild the second replica file system instance 122B based on the sparse replica file system instance. The block 810 includes method blocks 812, 814, and 816.

For example, at block 812, the second virtual controller 124B may receive the difference between the first snapshot and the second snapshot from the third computing node 106. More particularly, the second control module 304B may receive the difference between the first snapshot and the second snapshot from the sparse replica file system instance 126. Further, at block 814, the second control module 304B may receive the sparse replica file system instance 126 from the third computing node 106. Thereafter, at block 816, the second control module 304B may update the second replica file system instance 122B based on the difference between the first snapshot and the second snapshot and the sparse replica file system instance 126. In particular, the second control module 304B may apply the difference between the first snapshot and the second snapshot and the sparse replica file system instance 126 to the second replica file system instance 122B, thereby making the second replica file system instance 122B identical to the first replica file system instance 122A.

Moreover, in some examples, at block 818, the second control module 304B may also capture a third snapshot of the second replica file system instance 122B on the second computing node 104. Additionally, at block 820, the second control module 304B may copy the third snapshot of the second replica file system instance 122B to the third control module 304C. In response, at bock 822, the third control module 304C may update the sparse replica file system instance 126 such that the sparse replica file system instance 126 starts from content of the third snapshot. In particular, the third control module 304C may delete all the previous entries in the sparse replica file system instance 126 prior to the third snapshot, thereby saving storage space in the third computing node 106. In some examples, updating the sparse replica file system instance 126 may include deleting the sparse replica file system instance 126. In certain examples, updating the sparse replica file system instance 126 may include discarding the content of the sparse replica file system instance 126. The method 800 ends at block 824.

As will be appreciated, the systems and methods presented herein provide several advantages. For example, the sparse replica is created upon failure of a computing node hosting replica file systems. Also, the sparse replica file system instance 126 stores merely a sub-set of updates. Advantageously, use of such sparse replica file system instance 126 may reduce storage space, CPU time, and networking overhead in comparison to full 3-way or n-way replication (n>3). Also, the DU and/or DL conditions may be prevented due to the use of the sparse replica file system instance 126. Moreover, use of such sparse replica file system instance 126 also prevent a resource such as a VM to enter in to "HA non-compliant" state, thereby preventing unnecessary notifications to the users or administrators thereof.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
maintaining, by a processor based system, replica file system instances comprising a first replica file system instance on a first computing node and a second replica file system instance on a second computing node, wherein the first computing node and the second computing node are coupled to each other via a network;
detecting, by the processor based system, a failure condition associated with the second computing node;
in response to detection of the failure condition:
identifying, by the processor based system, a first snapshot of the second replica file system instance, wherein the first snapshot is a latest snapshot of the second replica file system instance captured when the second replica file system instance was up-to-date with the first replica file system instance;
capturing, by the processor based system, a second snapshot of the first replica file system instance on the first computing node;
instructing a third computing node, by the processor based system, to create a sparse replica file system instance on the third computing node based on the first snapshot and the second snapshot, wherein the third computing node is coupled to the network; and
directing, by the processor based system, a data update request to the first replica file system instance on the first computing node and the sparse replica file system instance on the third computing node.

2. The method of claim 1, wherein the data update request comprises a data write request, a file creation request, a file deletion request, a file rename request, a file movement request, or combinations thereof.

3. The method of claim 1, wherein directing the data update request comprises updating the sparse replica file system instance and the first replica file system instance based on the data update request received after creation of the sparse replica file system instance.

4. The method of claim 1, wherein instructing the third computing node comprises communicating, by the processor based system, information of the first snapshot and the second snapshot to the third computing node.

5. The method of claim 4, wherein instructing the third computing node further comprises communicating, by the processor based system, a difference between the first snapshot and the second snapshot to the third computing node.

6. The method of claim 4, further comprising creating the sparse replica file system instance in the third computing node based on the first snapshot and the second snapshot, wherein the sparse replica file system instance begins from the second snapshot.

7. The method of claim 6, further comprising rebuilding, by the second computing node upon recovering from the failure condition, the second replica file system instance, wherein rebuilding the second replica file system instance comprises:
receiving a difference between the first snapshot and the second snapshot from the third computing node;
receiving the sparse replica file system instance from the third computing node; and
updating the second replica file system instance based on:
the difference between the first snapshot and the second snapshot, and
the sparse replica file system instance.

8. The method of claim 1, further comprising rebuilding, by the second computing node upon recovering from the failure condition, the second replica file system instance based at least partially on the sparse replica file system instance, the first replica file system instance, or a combination thereof.

9. The method of claim 8, further comprising:
capturing a third snapshot of the second replica file system instance on the second computing node after rebuilding the second replica file system instance; and
copying the third snapshot of the second replica file system instance from the second computing node to the third computing node.

10. The method of claim 9, further comprising updating the sparse replica file system instance on the third computing node such that the sparse replica file system instance starts from the third snapshot thereby saving storage space in the third computing node.

11. A system comprising:
a first computing node, wherein the first computing node is coupled to a second computing node and a third computing node via a network, wherein the first computing node comprises:
a first data store; and
a virtual controller, wherein the virtual controller:
maintains a first replica file system instance in the first data store on the first computing node and a second replica file system instance in a second data store on a second computing node;
detects a failure condition associated with the second computing node;
in response to detection of the failure condition:
identifies a first snapshot of the second replica file system instance, wherein the first snapshot is a latest snapshot of the second replica file system instance captured when the second replica file system instance was up-to-date with the first replica file system instance;
captures a second snapshot of the first replica file system instance on the first computing node;

instructs the third computing node to create a sparse replica file system instance on a third data store on the third computing node based on the first snapshot and the second snapshot; and directs a data update request to the first replica file system instance on the first computing node and the sparse replica file system instance on the third computing node.

12. The system of claim 11, wherein the virtual controller further updates the sparse replica file system instance and the first replica file system instance based on the data update request received after creation of the sparse replica file system instance.

13. The system of claim 11, wherein the virtual controller instructs the third computing node to create the sparse replica file system instance based on the first snapshot and the second snapshot such that the sparse replica file system instance begins from the second snapshot.

14. The system of claim 13, wherein, upon recovering from the failure condition, the second computing node is to:
receive a difference between the first snapshot and the second snapshot from the third computing node;
receive the sparse replica file system instance from the third computing node; and
update the second replica file system instance based on:
the difference between the first snapshot and the second snapshot, and
the sparse replica file system instance.

15. The system of claim 11, wherein, upon recovering from the failure condition, the second computing node rebuilds the second replica file system instance based at least partially on the sparse replica file system instance, the first replica file system instance, or a combination thereof.

16. The system of claim 11, wherein the second computing node is to:
capture a third snapshot of the second replica file system instance after rebuilding the second replica file system instance; and
copy the third snapshot to the third computing node.

17. The system of claim 16, wherein the third computing node updates the sparse replica file system instance such that the sparse replica file system instance starts from the third snapshot thereby saving storage space in the third computing node.

18. A non-transitory machine readable medium storing instructions executable by a processing resource, the instructions comprising:
instructions to maintain replica of file system instances comprising a first replica file system instance on a first computing node and a second replica file system instance on a second computing node, wherein the first computing node and the second computing node are coupled to each other via a network;
instructions to detect a failure condition associated with the second computing node;
instructions to identify, in response to detection of the failure condition, a first snapshot of the second replica file system instance, wherein the first snapshot is a latest snapshot of the second replica file system instance captured when the second replica file system instance was up-to-date with the first replica file system instance;
instructions to capture, in response to detection of the failure condition, a second snapshot of the first replica file system instance on the first computing node;
instructions to instruct a third computing node to create a sparse replica file system instance on the third computing node in response to detection of the failure condition and based on the first snapshot and the second snapshot, wherein the third computing node is coupled to the network; and
instructions to direct a data update request to the first replica file system instance on the first computing node and the sparse replica file system instance on the third computing node.

* * * * *